United States Patent
Koike et al.

(10) Patent No.: US 11,829,572 B2
(45) Date of Patent: Nov. 28, 2023

(54) THREE DIMENSIONAL INPUT FOR A CYLINDRICAL DISPLAY DEVICE

(71) Applicant: SONY GROUP CORPORATION, Tokyo (JP)

(72) Inventors: Kaoru Koike, Tokyo (JP); Itaru Shimizu, Tokyo (JP); Takanobu Omata, Tokyo (JP); Yuichi Miyagawa, Tokyo (JP); Hisataka Izawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/755,176

(22) PCT Filed: Oct. 1, 2020

(86) PCT No.: PCT/JP2020/037455
§ 371 (c)(1),
(2) Date: Apr. 22, 2022

(87) PCT Pub. No.: WO2021/085028
PCT Pub. Date: May 6, 2021

(65) Prior Publication Data
US 2022/0365658 A1    Nov. 17, 2022

(30) Foreign Application Priority Data
Oct. 31, 2019   (JP) .................................. 2019-198491

(51) Int. Cl.
*G06F 3/04815*   (2022.01)
*G06F 3/042*   (2006.01)
(Continued)

(52) U.S. Cl.
CPC .......... *G06F 3/04815* (2013.01); *G06F 3/042* (2013.01); *G06F 3/04845* (2013.01);
(Continued)

(58) Field of Classification Search
None
See application file for complete search history.

(56) References Cited

U.S. PATENT DOCUMENTS

| | | | |
|---|---|---|---|
| 2003/0142144 A1* | 7/2003 | Balakrishnan | G06F 3/033 715/848 |
| 2004/0207599 A1* | 10/2004 | Kurtenbach | G06F 3/041 345/156 |

(Continued)

FOREIGN PATENT DOCUMENTS

| | | |
|---|---|---|
| CN | 105278112 A | 1/2016 |
| CN | 108140383 A | 6/2018 |

(Continued)

OTHER PUBLICATIONS

International Search Report and Written Opinion of PCT Application No. PCT/JP2020/037455, dated Nov. 10, 2020, 11 pages of ISRWO.

*Primary Examiner* — Amare Mengistu
*Assistant Examiner* — Sarvesh J Nadkarni
(74) *Attorney, Agent, or Firm* — CHIP LAW GROUP

(57) ABSTRACT

There is provided an image display apparatus that enables an intuitive operation even when a detection target is not able to be inserted into a first space in which a three-dimensional object is visually recognized. A position of a detection target is detected, and a display position of a pointer displayed by a display unit is moved on a basis of a position of the detection target that exists within a second space not overlapping the first space which is a space in which the three-dimensional object is displayed among the position of the detected detection target.

11 Claims, 8 Drawing Sheets

(51) Int. Cl.
*G06F 3/04845* (2022.01)
*G03H 1/00* (2006.01)

(52) U.S. Cl.
CPC ... *G03H 1/0005* (2013.01); *G03H 2001/0088* (2013.01); *G06F 2203/04101* (2013.01); *G06F 2203/04104* (2013.01); *G06F 2203/04802* (2013.01); *G06F 2203/04808* (2013.01)

(56) References Cited

U.S. PATENT DOCUMENTS

| | | | | |
|---|---|---|---|---|
| 2015/0355471 | A1* | 12/2015 | Yoneno | G02B 5/13 |
| | | | | 348/51 |
| 2016/0070356 | A1* | 3/2016 | Aguirre | G06F 3/011 |
| | | | | 345/156 |
| 2019/0138266 | A1 | 5/2019 | Takechi et al. | |
| 2019/0235643 | A1* | 8/2019 | Kuribayashi | G06F 3/0416 |
| 2020/0389691 | A1* | 12/2020 | Yoshizawa | G09G 3/20 |

FOREIGN PATENT DOCUMENTS

| | | |
|---|---|---|
| CN | 109643206 A | 4/2019 |
| CN | 110199251 A | 9/2019 |
| JP | 2012-208705 A | 10/2012 |
| JP | 2013-105084 A | 5/2013 |
| JP | 2015-232633 A | 12/2015 |
| JP | 2018-014575 A | 1/2018 |
| JP | 2019-133395 A | 8/2019 |
| KR | 10-2018-0030767 A | 3/2018 |
| WO | 2018/003862 A1 | 1/2018 |
| WO | 2018/016095 A1 | 1/2018 |
| WO | 2018/142524 A1 | 8/2018 |
| WO | 2018/163945 A1 | 9/2018 |

* cited by examiner

[FIG. 1]
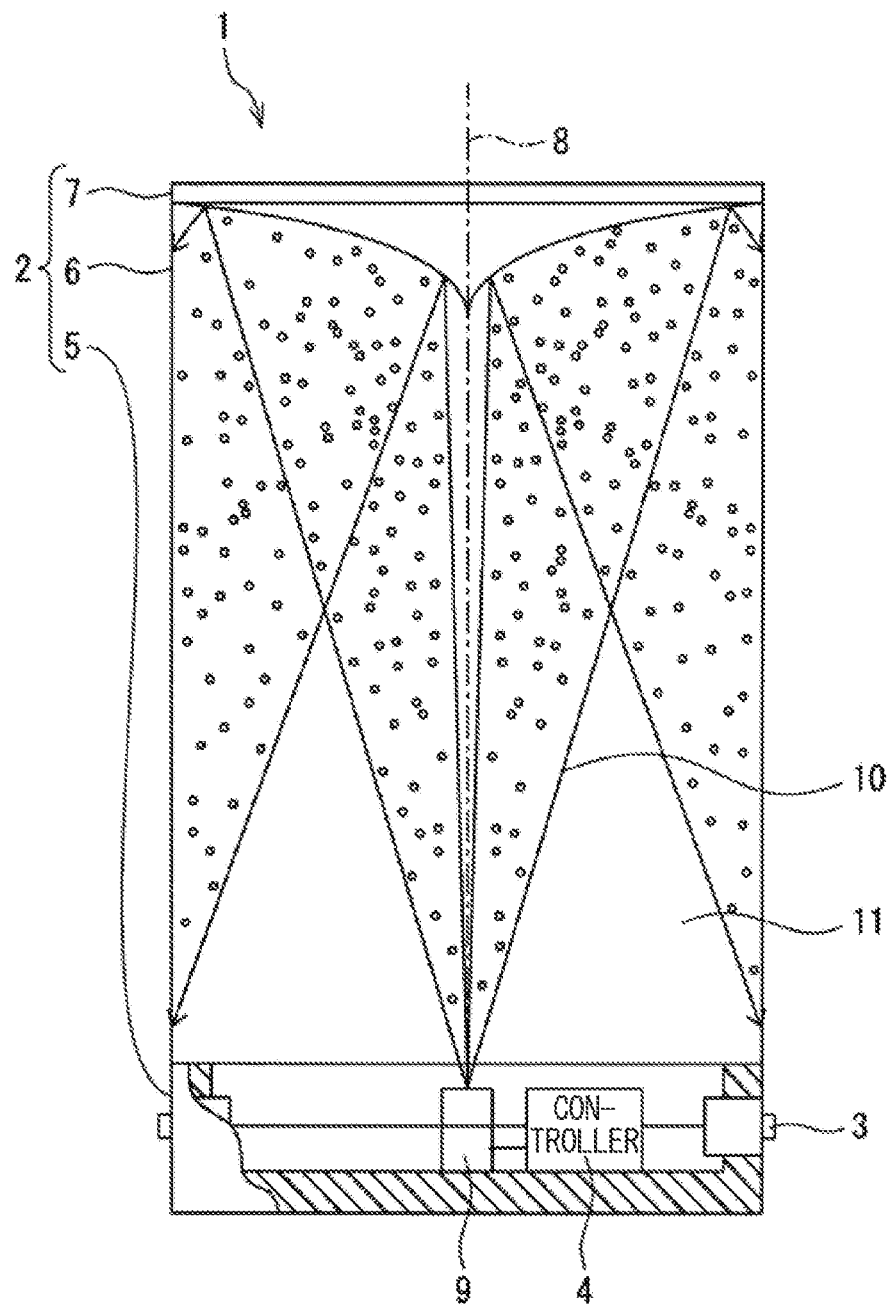

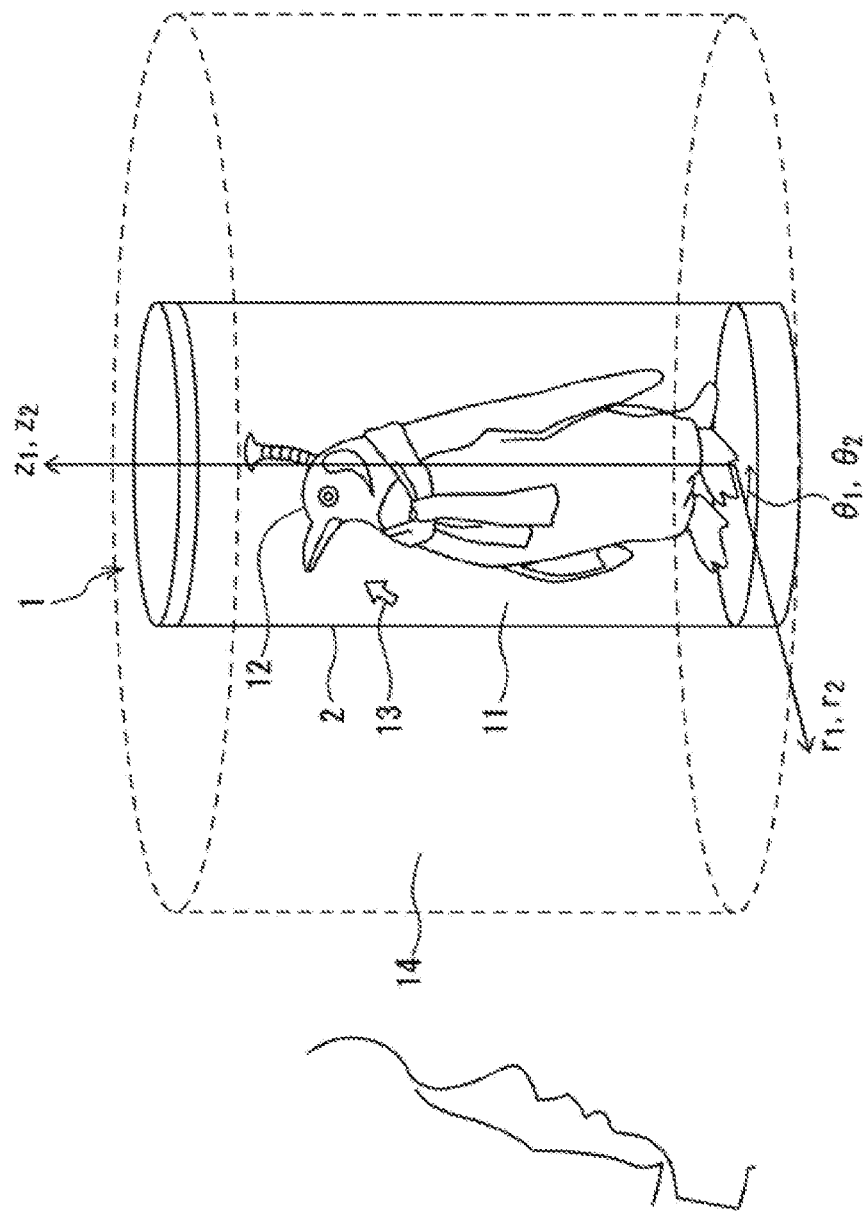
[FIG. 2]

[FIG. 3]
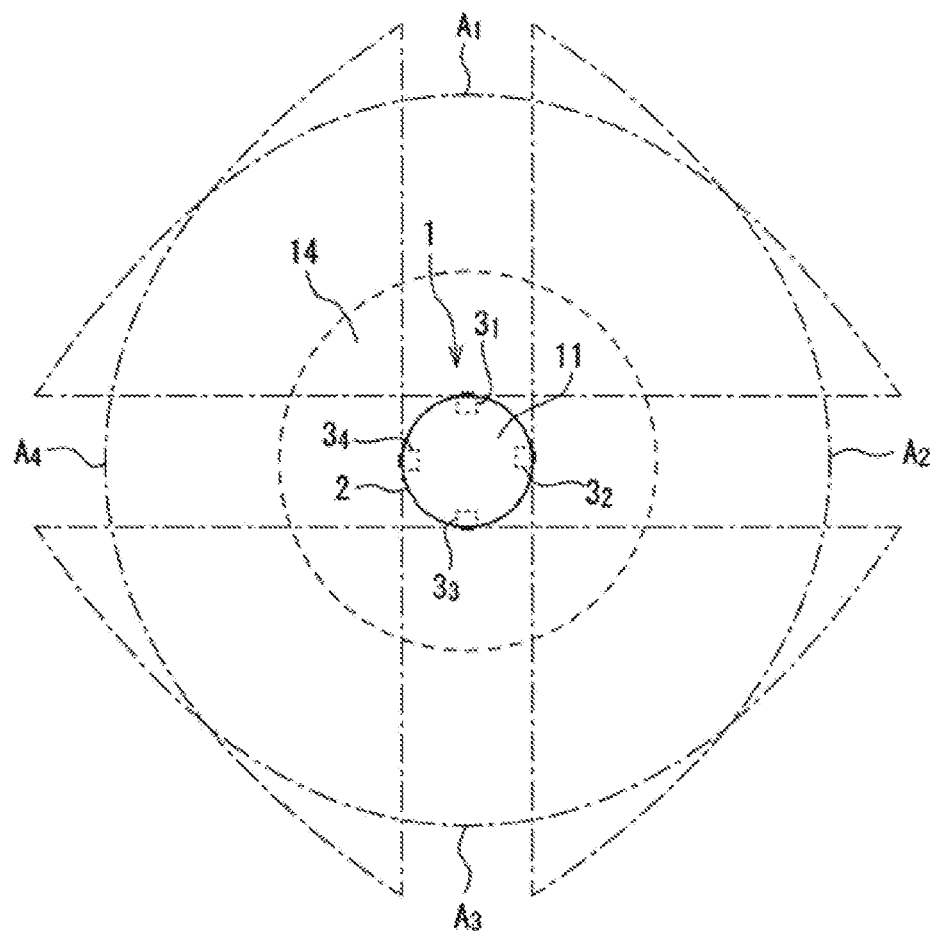
[FIG. 4]
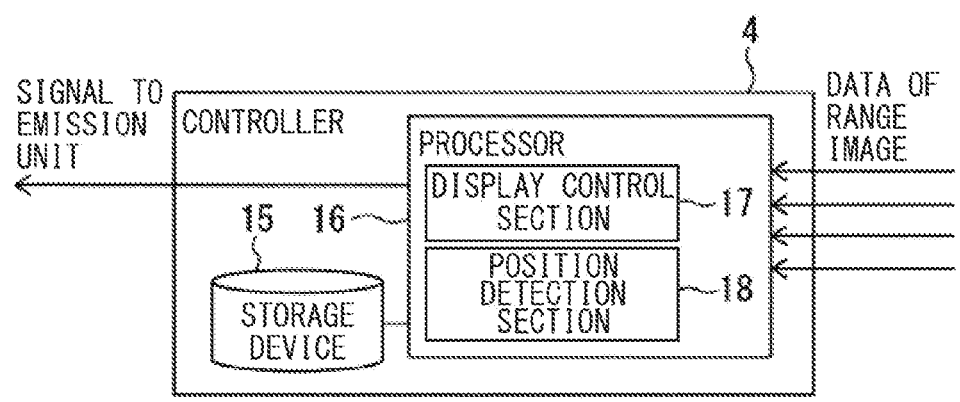

[FIG. 5]
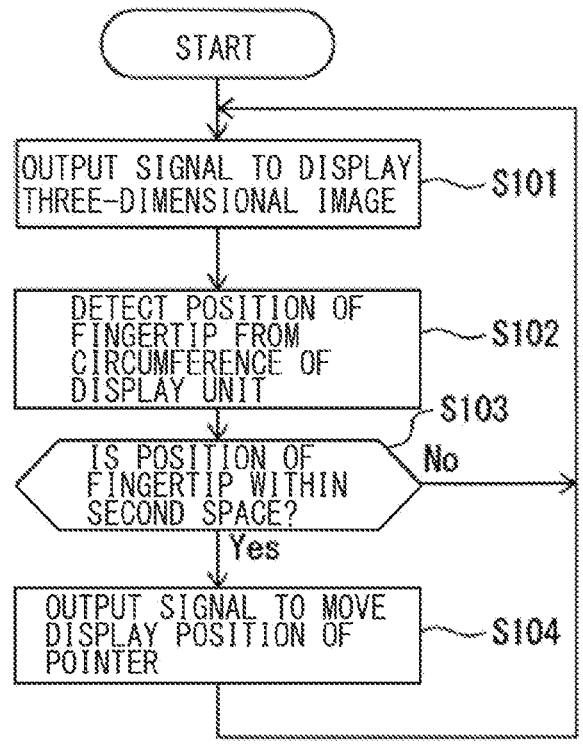
[FIG. 6A]
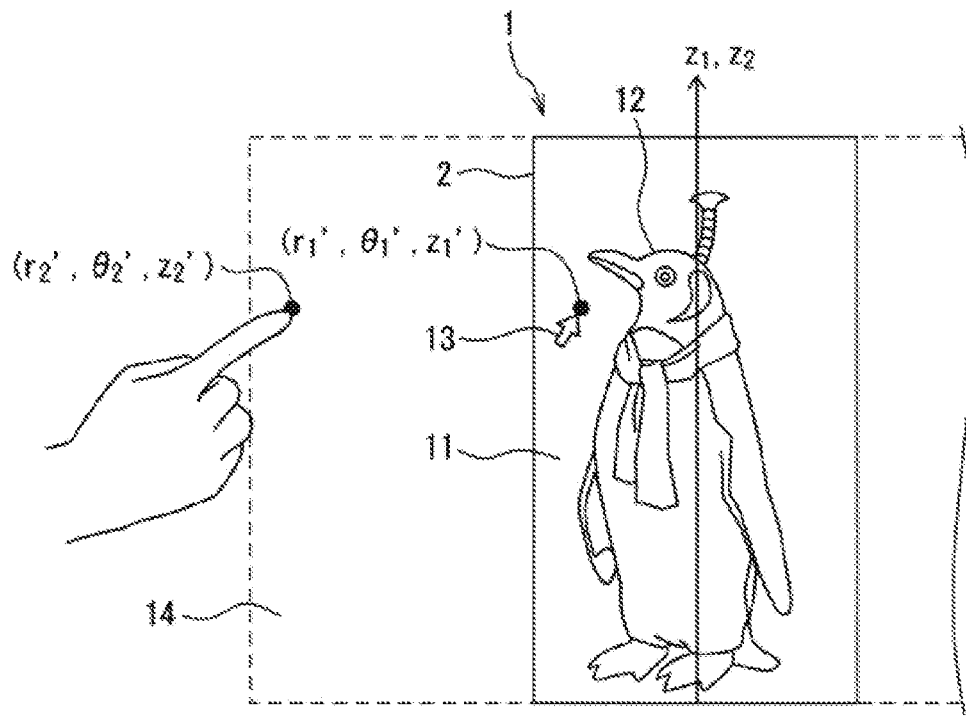

[FIG. 6B]
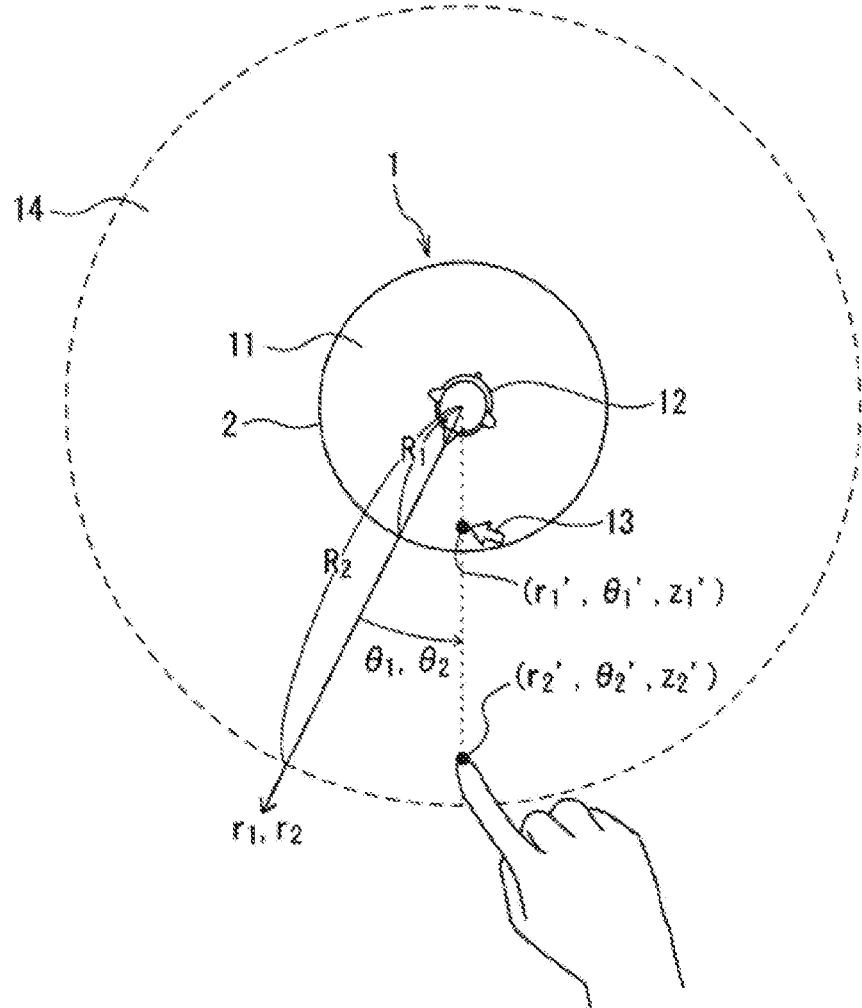

[FIG. 6C]
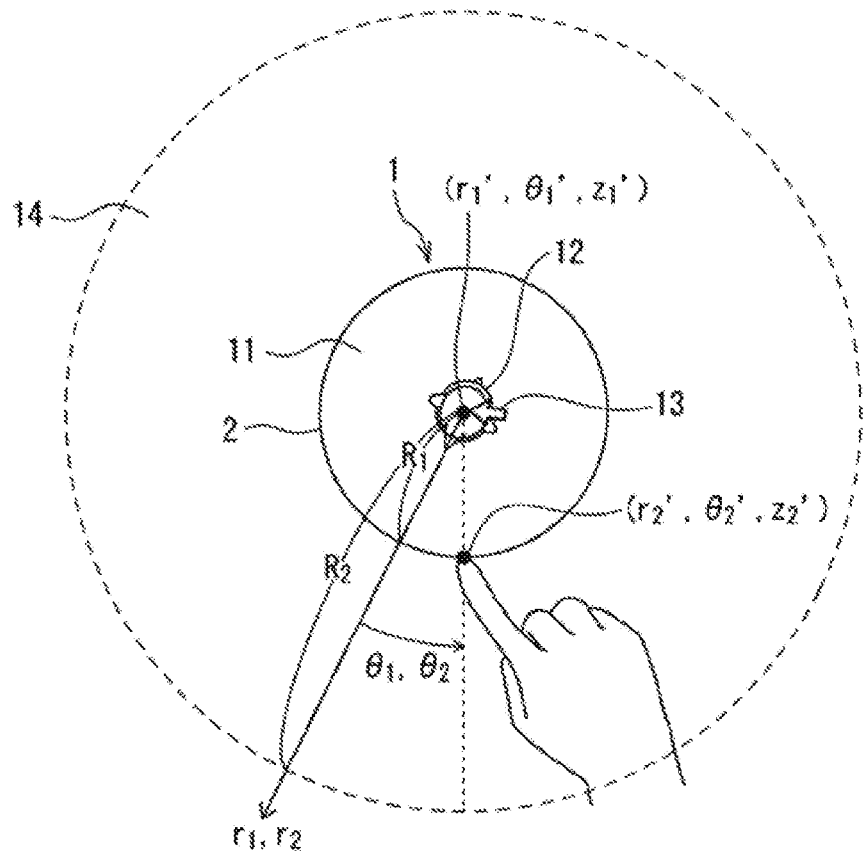
[FIG. 7]
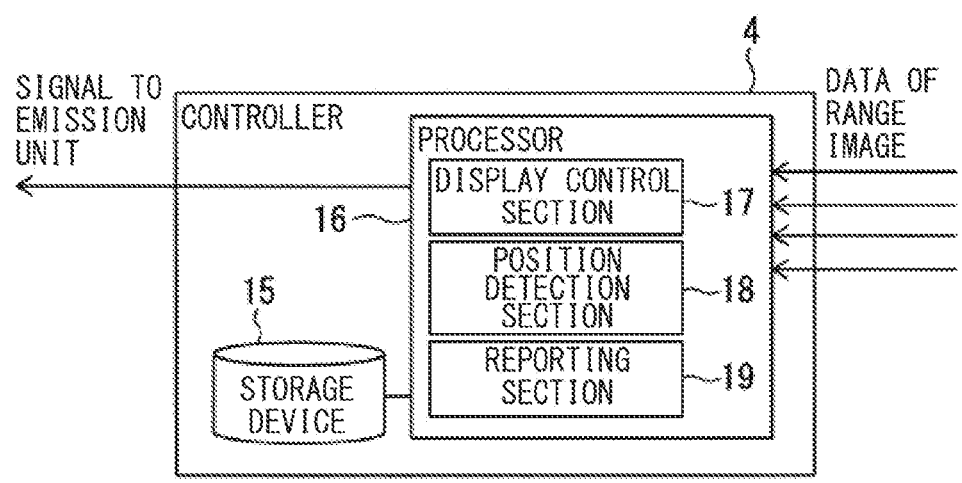

[FIG. 8]
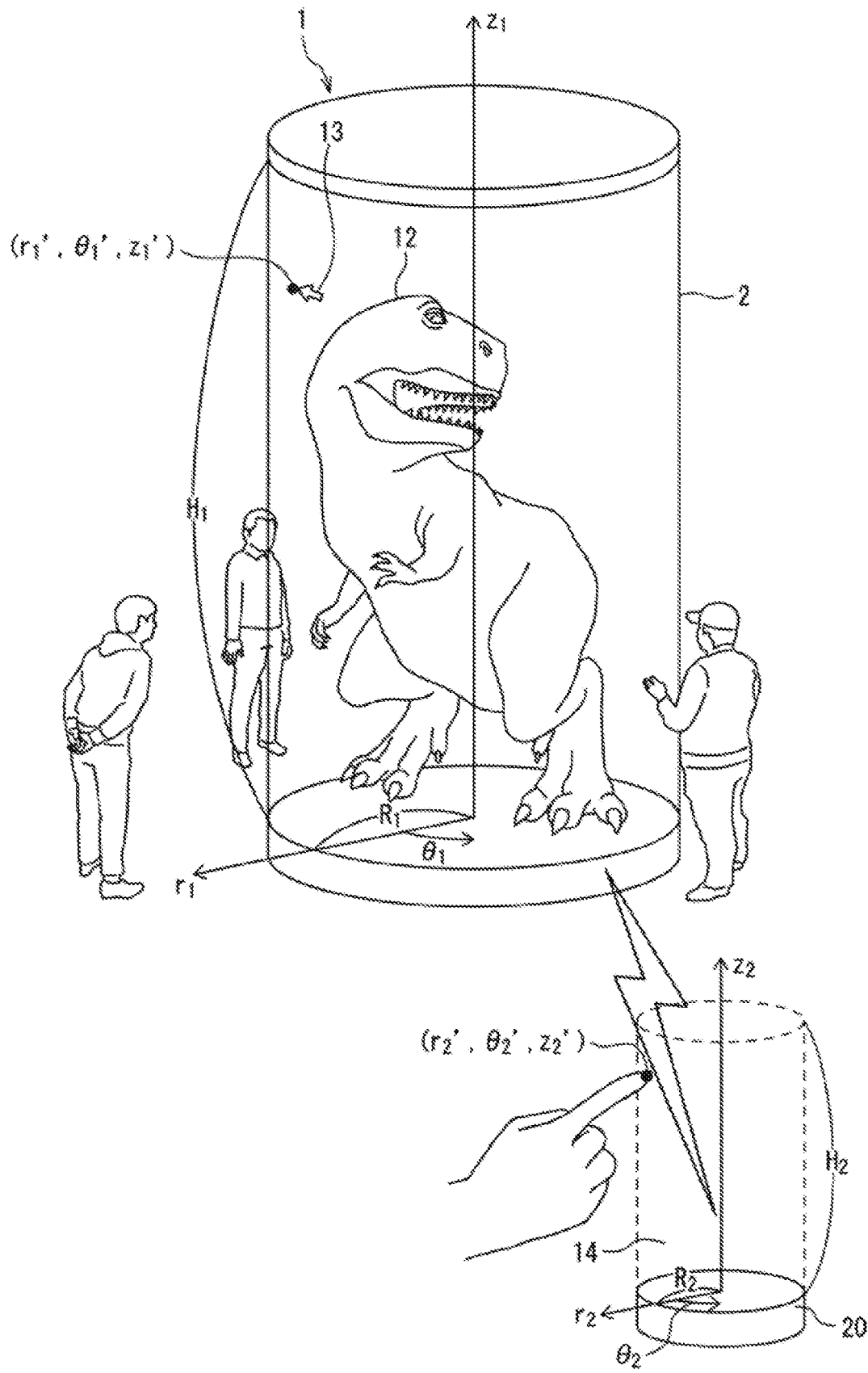

[FIG. 9]
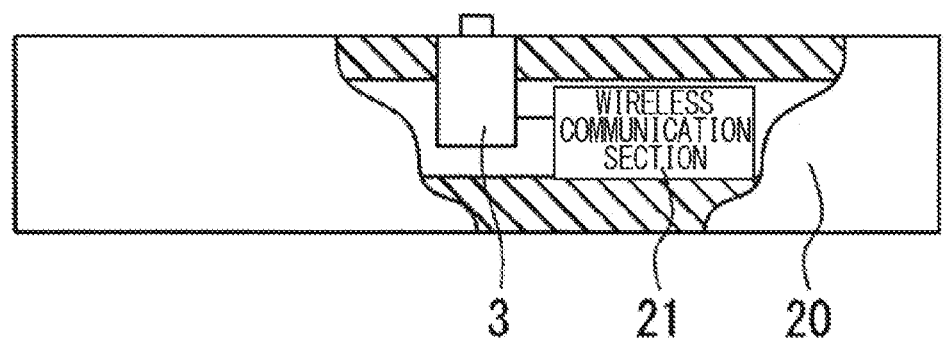

THREE DIMENSIONAL INPUT FOR A CYLINDRICAL DISPLAY DEVICE

CROSS REFERENCE TO RELATED APPLICATIONS

This application is a U.S. National Phase of International Patent Application No. PCT/JP2020/037455 filed on Oct. 1, 2020, which claims priority benefit of Japanese Patent Application No. JP 2019-198491 filed in the Japan Patent Office on Oct. 31, 2019 Each of the above-referenced applications is hereby incorporated herein by reference in its entirety.

TECHNICAL FIELD

The present technology relates to an image display apparatus.

BACKGROUND ART

There has heretofore been proposed an image display apparatus by which a three-dimensional object appears to exist in a space of a front (hereinafter, also referred to as a "front space") of a display screen (e.g., see PTL 1). An image display apparatus described in PTL 1 allows a finger to be inserted into the front space to detect a position of a fingertip, thereby allowing a particular position to be specified in the front space and an intuitive operation to be performed.

In addition, in recent years, there has heretofore been proposed an image display apparatus in which a cylindrical screen and a substantially disc-shaped mirror are stacked on upper side of a cylindrical base, and a color projector that emits laser light corresponding to each color of RGB upward is disposed at the center of the base (e.g., see PTL 2). In the image display apparatus described in PTL 2, the color projector emits the laser light radially upward, and the emitted laser light is reflected radially toward the entire circumference of a screen by a reflective mirror. Then, a three-dimensional image, by which a three-dimensional object is visually recognizable from a plurality of circumferential directions, is displayed by the screen on which the laser light is reflected to the entire circumference, within a space partitioned by the screen.

CITATION LIST

Patent Literature

PTL 1: Japanese Unexamined Patent Application Publication No. 2012-208705
PTL 2: International Publication No. WO2018/163945

SUMMARY OF THE INVENTION

Problem to be Solved by the Invention

However, in an image display apparatus described in PTL 2, it may not be possible to insert a detection target such as a finger into a space in which a three-dimensional object is visually recognized. Therefore, it may not be possible to cause a user to perform an intuitive operation by applying the technique described in PTL 1.

An object of the present disclosure is to provide an image display apparatus that enables an intuitive operation even when a detection target is not able to be inserted into a first space in which a three-dimensional object is visually recognized.

Means for Solving the Problem

An image display apparatus of the present disclosure includes: (a) a display unit that displays a three-dimensional image, by which a three-dimensional object and a pointer appear to exist within a first space partitioned by a member configuring an outwardly convex outer surface, to be visually recognizable from a plurality of circumferential directions; (b) a position detection section that detects a position of a detection target; and (c) a display control section that moves a display position of the pointer displayed by the display unit on a basis of a position of the detection target that exists within a predetermined second space not overlapping the first space among the position of the detection target detected by the position detection section.

BRIEF DESCRIPTION OF THE DRAWINGS

FIG. 1 illustrates an overall configuration of an image display apparatus according to a first embodiment.
FIG. 2 illustrates the image display apparatus in which a three-dimensional image is displayed.
FIG. 3 illustrates an imaging range of each TOF sensor.
FIG. 4 illustrates an internal configuration of a controller.
FIG. 5 is a flowchart illustrating processing contents of control processing.
FIG. 6A is a side view of an operation of the image display apparatus in a case where a first space and a second space are seen from lateral side.
FIG. 6B is a side view of an operation of the image display apparatus in a case where the first space and the second space are seen from top side.
FIG. 6C is a side view of an operation of the image display apparatus in a case where the first space and the second space are seen from the top side.
FIG. 7 illustrates an internal configuration of a controller according to a modification example.
FIG. 8 illustrates an overall configuration of an image display apparatus according to a second embodiment.
FIG. 9 illustrates an internal configuration of a detection device.

MODES FOR CARRYING OUT THE INVENTION

Hereinafter, description is given, with reference to FIGS. 1, 2, 3, 4, 5, 6A, 6B, 6C, 7, 8, and 9, of an example of an image display apparatus according to each of embodiments of the present disclosure. The embodiments of the present disclosure are described in the following order. It is to be noted that the present disclosure is not limited to the following examples. In addition, the effects described herein are illustrative and not limiting, and may have other effects.

1. First Embodiment: Image Display Apparatus
   1-1 Overall Configuration of Image Display Apparatus
   1-2 Contents of Control Processing
   1-3 Modification Examples
2. Second Embodiment: Image Display Apparatus

1. First Embodiment

1-1 Overall Configuration of Image Display Apparatus

Description is given of an image display apparatus according to a first embodiment of the present disclosure. An image display apparatus 1 according to the first embodiment is a display apparatus that enables a three-dimensional image to be visually recognized from a plurality of circumferential directions. The image display apparatus 1 is sized to be small enough to be held with one hand as illustrated in FIG. 2.

As illustrated in FIG. 1, the image display apparatus 1 of the first embodiment includes a display unit 2, a plurality of information acquisition units 3, and a controller 4. In FIG. 1, a portion of a base 5 is illustrated broken to enable a configuration inside the base 5 of the display unit 2 to be visually recognized.

The display unit 2 is formed by stacking, on upper side of the base 5 having a cylindrical shape with an upper surface being open and a lower surface being closed, a cylindrical screen 6, and a substantially disc-shaped reflective mirror 7 in this order.

At the center of the inside of the base 5, there is disposed an emission unit 9 with an optical axis 8 being vertically upward. As the emission unit 9, for example, there may be employed a color projector that displays each pixel by scanning laser light (hereinafter, also referred to as "image light 10") corresponding to each color of RGB. Then, the emission unit 9 emits the image light 10 to configure a three-dimensional image radially upward in accordance with a signal from the controller 4 to reflect the emitted image light 10 on the screen 6 with the reflective mirror 7.

As the three-dimensional image, for example, there may be employed an image by which a three-dimensional object 12 and a pointer 13 (see FIG. 2) appear to exist within a space partitioned by the screen 6, i.e., a space (hereinafter, also referred to as a "first space 11") of a hollow portion inside the screen 6. As the pointer 13, for example, there may be employed a figure indicating a position in the three-dimensional image. FIG. 2 illustrates a state in which a character of a king penguin is represented as the three-dimensional object 12 and an arrow is represented as the pointer 13. In the first space 11, there is set a cylindrical coordinate system $r_1\theta_1z_1$, with the center axis of the first space 11 being a $z_1$ axis, and an intersection of a bottom surface of the first space 11 and the $z_1$ axis being the origin. Here, $r_1$ is a radial component, $\theta_1$ is an azimuthal component, and $z_1$ is a height component.

It is to be noted that, although the first embodiment gives an example in which a space partitioned by the cylindrical screen 6 is used as the first space 11, other configurations may also be employed. It is sufficient for the first space 11 to be a space partitioned by a member configuring an outwardly convex outer surface; for example, the first space 11 may be a space partitioned by the screen 6 having a semicylindrical shape, or may be a space partitioned by the screen 6 having a square tubular shape.

In addition, a space (hereinafter, also referred to as a "second space 14") to allow a user to input a move destination of the pointer 13 is provided around the first space 11. That is, the second space 14 is a space not overlapping the first space 11. As the second space 14, for example, there may be employed a cylindrical space surrounding the circumference of the first space 11. In the second space 14, there is set a cylindrical coordinate system $r_2\theta_2z_2$, with the $z_1$ axis of the first space 11 being a $z_2$ axis and an $r_1$ axis of the first space 11 being an $r_2$ axis. Here, $r_2$ is a radial component, $\theta_2$ is an azimuthal component, and $z_2$ is a height component.

As the screen 6, for example, there may be employed a hologram screen on which a three-dimensional image is displayed by emitting the image light 10 that is incident in a diffusing manner. For example, it may be possible to employ a transmissive hologram that enables the screen 6 to be seen through, as described in International Publication No. WO2018/163945. According to the transmissive hologram, as illustrated in FIG. 2, back side of the image display apparatus 1 is visible from a location where the three-dimensional object 12 and the pointer 13 represented by the three-dimensional image are not displayed, thus enabling the screen 6 to feel like a container of transparent glass or the like.

As the reflective mirror 7, there may be employed a mirror having below a reflective surface that reflects the image light 10 emitted from the emission unit 9. Then, the reflective mirror 7 reflects the image light 10 emitted radially upward from the emission unit 9 radially toward the entire circumference of the screen 6.

In the display unit 2 having the above configuration, as illustrated in FIG. 1, the emission unit 9 emits the image light 10 radially upward in accordance with the signal from the controller 4, and the emitted image light 10 is reflected by the reflective mirror 7 radially toward the entire circumference of the screen 6. Then, as illustrated in FIG. 2, the screen 6 on which the image light 10 is reflected to the entire circumference enables the three-dimensional image, by which the three-dimensional object 12 and the pointer 13 appear to exist within the first space 11 partitioned by the screen 6, to be visually recognized from the plurality of circumferential directions. At this time, allowing the screen 6 to feel like a container of transparent glass or the like enables the three-dimensional object 12 to appear to be contained in the container. This eliminates the need for a special device such as a head-mounted display, thus enabling the three-dimensional image to be seen without bothering to wear the device.

The plurality of information acquisition units 3 are evenly spaced on a sidewall portion of the base 5 or a sidewall portion of the reflective mirror 7, and obtain information concerning a position of a detection target existing around the display unit 2. A detection result of the information acquisition unit 3 is outputted to the controller 4. As the information acquisition unit 3, for example, there may be employed a TOF (Time Of Flight) sensor that shoots a range image around the display unit 2, a camera that shoots an image around the display unit 2, an ultrasonic sensor that measures time from emission of an ultrasonic wave to the circumference of the display unit 2 to return of a reflected wave, a capacitance sensor that measures an electrostatic capacitance around the display unit 2 to thereby detect a distance to a body around the display unit 2, or a magnetic sensor by measuring a change in detection of a distance to the body around the display unit 2 by measuring a magnetic flux density around the display unit 2. In the following description of the first embodiment, the TOF sensor disposed on the sidewall portion of the base 5 is employed as the information acquisition unit 3, and the "information acquisition unit 3" is also referred to as a "TOF sensor 3".

FIGS. 1 to 3 exemplify a case where four TOF sensors 3 having lens optical axes varied by 90° from each other are used to shoot a range image 360° around the display unit 2. In addition, in FIG. 3, a region $A_1$ indicates a shooting range of a first TOF sensor 3 (also referred to as "$3_1$" in FIG. 3); likewise in the following, a region $A_2$ indicates a shooting range of a second TOF sensor 3 (also referred to as "$3_2$" in FIG. 3), a region $A_3$ indicates a shooting range of a third TOF sensor 3 (also referred to as "$3_3$" in FIG. 3), and a region $A_4$ indicates a shooting range of a fourth TOF sensor 3 (also referred to as "$3_4$" in FIG. 3).

It is to be noted that in a case where the capacitance sensor or the magnetic sensor is employed as the information acquisition unit 3, a configuration may be adopted in which a transparent or semi-transparent material is used to dispose the sensor on the entire circumferential surface of the outer peripheral surface of the screen 6.

The controller 4 is disposed inside the base 5, and includes hardware resources such as a storage device 15 and a processor 16 as illustrated in FIG. 4.

The storage device 15 stores a control program of the image display apparatus 1 executable by the processor 16. In addition, the storage device 15 stores various types of data necessary for executing the control program.

The processor 16 implements a display control section 17 and a position detection section 18 in accordance with the control program stored in the storage device 15. Then, the display control section 17 and the position detection section 18 are used to output a signal to control the image light 10 to the emission unit 9 on the basis of data of the range image outputted from the TOF sensor 3, and to execute control processing to move a display position of the pointer 13 represented by the three-dimensional image.

1-2 Contents of Control Processing

Next, description is given of control processing to be executed by the display control section 17 and the position detection section 18, which are implemented by the processor 16. The control processing is executed when an unillustrated power source switch of the image display apparatus 1 is brought into an ON state.

As illustrated in FIG. 5, first, in step S101, the display control section 17 outputs, to the emission unit 9, a signal to emit the image light 10 for displaying a three-dimensional image on the display unit 2. As illustrated in FIG. 2, this enables the display unit 2 to display a three-dimensional image, by which the three-dimensional object 12 and the pointer 13 appear to exist within the first space 11, to be visually recognizable from a plurality of circumferential directions.

Subsequently, in step S102, the position detection section 18 detects a position of a predetermined detection target. As the detection target, for example, there may be employed a fingertip, a stylus pen, and a marker. Suppose that, in the following description of the first embodiment, the fingertip is employed as the detection target. Specifically, the position detection section 18 first acquires data of a moving image outputted from each of the plurality of TOF sensors 3. Subsequently, a position of a fingertip of a person who exists around the display unit 2 is detected on the basis of the acquired data, i.e., each range image around the display unit 2. In the detection of the position of the fingertip, the cylindrical coordinate system $r_2\theta_2z_2$ is used to detect coordinates $(r_2', \theta_2', z_2')$ at the position of the fingertip. As the detection method, for example, there may be employed a method of performing pattern matching or the like on the range image.

Next, the processing proceeds to step S103, in which the display control section 17 determines whether a position of the fingertip detected in step S102 exists within the second space 14. Then, in a case where determination is made that the position of the fingertip is not within the second space 14 (No), the processing returns to step S102. Thus, the pointer 13 displayed by the display unit 2 does not move to remain at the current position. Meanwhile, in a case where determination is made that a position of the fingertip exists within the second space 14 (Yes), the processing proceeds to step S104.

In step S104, the display control section 17 outputs, to the emission unit 9, a signal to move the display position of the pointer 13 displayed by three-dimensional image. Specifically, first, coordinates $(r_1', \theta_1', z_1')$ of a move destination of the pointer 13 are calculated on the basis of the coordinates $(r_2', \theta_2', z_2')$ at the position of the fingertip existing within the second space 14, among coordinates of the position of the fingertip detected in step S102. For example, as illustrated in FIGS. 6A, 6B and 6C, $\theta_1'$ and $z_1'$ are decided to allow values of $\theta_2'$ and $z_2'$ of the coordinates $(r_2', \theta_2', z_2')$ at the position of the fingertip in the cylindrical coordinate system $r_2\theta_2z_2$ and values of $\theta_1'$ and $z_1'$ of the coordinates $(r_1', \theta_1', z_1')$ of the pointer 13 in the cylindrical coordinate system $r_1\theta_1z_1$ to be the same. Thus, the user changes the position of the fingertip in a height direction to thereby be able to freely alter a position of the pointer 13 in the height direction in the first space 11.

In addition, for example, $r_1'$ is decided, as illustrated in FIG. 6C, to allow $r_1'$ of the coordinates $(r_1', \theta_1', z_1')$ of the pointer 13 in the cylindrical coordinate system $r_1\theta_1z_1$ to be "0" in a case where $r_2'$ of the coordinates $(r_2', \theta_2', z_2')$ at the position of the fingertip existing within the second space 14 is the same as a value $R_1$ of a radius of the first space 11, and, as illustrated in FIG. 6B, to allow $r_1'$ of the coordinates $(r_1', \theta_1', z_1')$ to be the same as the value $R_1$ of the radius of the first space 11 in a case where $r_2'$ of the coordinates $(r_2', \theta_2', z_2')$ is the same as a value $R_2$ of the radius of the second space 14. Further, for example, in a case where $r_2'$ of the coordinates $(r_2', \theta_2', z_2')$ at the position of the fingertip exists within a range $R_1 \sim R_2$, which is larger than $R_1$ and smaller than $R_2$, $r_1'$ of the coordinates $(r_1', \theta_1', z_1')$ of the pointer 13 may be set to a value closer to "0" as $r_2'$ of the coordinates $(r_2', \theta_2', z_2')$ at the position of the fingertip is closer to $R_1'$. In this case, as a calculation expression of $r_1'$, for example, there may be employed $r_1'=(r_2'-R_1)\times R_1/(R_2-R_1)$. Thus, the user changes a distance from a surface of the display unit 2 to the fingertip to thereby be able to freely alter a position in a depth direction (a position in a radial direction) of the pointer 13 in the first space 11.

Subsequently, the display control section 17 creates image data of a three-dimensional image in which the pointer 13 has been moved to the coordinates $(r_2', \theta_2', z_2')$ of a move destination of the decided pointer 13. Subsequently, the created image data is converted into data of the image light 10, and a signal to irradiate the image light 10 indicated by the data obtained by the conversion is outputted to the emission unit 9; then the processing returns to step S102. Thus, in the image display apparatus 1, as illustrated in FIG. 7, the display position of the pointer 13 displayed by the display unit 2 is moved to a position corresponding to the position of the fingertip of the user in the second space 14.

It is to be noted that, in a case where a plurality of positions of the fingertips detected in step S102 exist within the second space 14, a configuration may be adopted in which the coordinates $(r_1', \theta_1', z_1')$ of the move destination of the pointer 13 are calculated using the coordinates $(r_2', \theta_2', z_2')$ at the position of the fingertip having entered the second space 14 at first among the positions of the plurality of fingertips. That is, the display position of the pointer 13 is moved only on the basis of the position of the fingertip having entered the second space 14 at first among the positions of the plurality of fingertips existing within the second space 14.

In addition, in a case where the pointer 13 is in contact with the three-dimensional object 12 at the move destination of the pointer 13, a configuration may be adopted in which, as image data of a three-dimensional image, the display control section 17 brings the pointer 13 into contact with the three-dimensional object 12, and image data is created in which the three-dimensional object 12 is changed in response to the contact of the pointer 13. As the change of the three-dimensional object 12 in response to the contact of the pointer 13, for example, there may be employed movement of the display position due to pressing by the pointer 13, or deformation at a pressed location due to the pressing by the pointer 13.

As described above, in the image display apparatus 1 according to the first embodiment of the present disclosure, a position of the detection target is detected, and the display position of the pointer 13 displayed by the display unit 2 is moved on the basis of a position of the detection target existing within the predetermined second space 14 not overlapping the first space 11, among the position of the detected detection target. Therefore, the user inserts the detection target into the second space 14 and moves the position of the detection target to thereby be able to move the display position of the pointer 13 to a position corresponding to the position of the detection target. Therefore, it is possible to provide the image display apparatus 1 that enables an intuitive operation even when the detection target is not able to be inserted into the first space 11.

In addition, in the image display apparatus 1 according to the first embodiment of the present disclosure, the second space 14 is set as a space surrounding the circumference of the first space 11, the position of the pointer 13 is able to be altered by moving the detection target around the screen 6, thus making it possible to operate the position of the pointer 13 more intuitively.

In addition, in the image display apparatus 1 according to the first embodiment of the present disclosure, the display unit 2 includes the cylindrical screen 6 on which the three-dimensional image is displayed, and the first space 11 is set as a space of the hollow portion inside the screen 6, thus making it possible to display the three-dimensional object 12 in the screen 6.

In addition, in the image display apparatus 1 according to the first embodiment of the present disclosure, the cylindrical coordinate system $r_2\theta_2z_2$ with the center axis of the second space 14 being the $z_2$ axis is set in the second space 14, and the cylindrical coordinate system $r_2\theta_2z_2$ is used to detect the coordinates $(r_2', \theta_2', z_2')$ at the position of the detection target. Therefore, the coordinate system is suitable for the shape of the second space 14, thus making it possible to represent the position of the detection target more appropriately.

In addition, in the image display apparatus 1 according to the first embodiment of the present disclosure, the cylindrical coordinate system $r_1\theta_1z_1$ with the center axis of the first space 11 being the $z_1$ axis is set in the first space 11. In addition, the pointer 13 displayed by the display unit 2 is moved to allow the values of $\theta_2'$ and $z_2'$ of the coordinates $(r_2', \theta_2', z_2')$ at the position of the detection target detected by the position detection section 18 and the values of $\theta_1'$ and $z_1'$ of the coordinates $(r_1', \theta_1', z_1')$ of the pointer 13 in the cylindrical coordinate system $r_1\theta_1z_1$ to be the same. Thus, it is possible to operate the position of the pointer 13 more intuitively.

In addition, in the image display apparatus 1 according to the first embodiment of the present disclosure, the pointer 13 displayed by the display unit 2 is moved to allow $r_1'$ of the coordinates $(r_1', \theta_1', z_1')$ of the pointer 13 in the cylindrical coordinate system $r_1\theta_1z_1$ to be "0" in a case where $r_2'$ of the coordinates $(r_2', \theta_2', z_2')$ at the position of the detection target detected by the position detection section 18 is the same as the value $R_1$ of the radius of the first space 11, and to allow $r_1'$ of the coordinates $(r_1', \theta_1', z_1')$ to be the same as the value $R_1$ of the radius of the first space 11 in a case where $r_2'$ of the coordinates $(r_2', \theta_2', z_2')$ is the same as the value $R_2$ of the radius of the second space 14. Thus, it is possible to operate the position of the pointer 13 more intuitively.

In addition, the image display apparatus 1 according to the first embodiment of the present disclosure includes the information acquisition unit 3 that is disposed at an upper portion or a lower portion of the display unit 2 and acquires information concerning the position of the detection target. Then, on the basis of a detection result of the information acquisition unit 3, the position of the detection target is detected. Thus, it is possible to operate the position of the detection target more appropriately.

In addition, in the image display apparatus 1 according to the first embodiment of the present disclosure, the TOF sensor, the camera, a touch panel, the capacitance sensor, or the magnetic sensor is employed as the information acquisition unit 3. Therefore, it is possible to acquire information concerning the position of the detection target more appropriately, and thus to detect the position of the detection target more appropriately.

In addition, in the image display apparatus 1 according to the first embodiment of the present disclosure, a fingertip of a person is set as the detection target. In addition, in a case where a plurality of positions of fingertips detected by the position detection section 18 exist within the second space 14, the display position of the pointer 13 displayed by the display unit 2 is moved only on the basis of the position of the fingertip having entered the second space 14 at first among the plurality of positions of the fingertips. Therefore, in a case where a plurality of fingertips result in erroneously entering the second space 14, it is possible to prevent the pointer 13 from moving to a position not intended by the user.

1-3 Modification Examples (1) It is to be noted that, in the first embodiment, the example has been given in which, in a case where a plurality of positions of fingertips are detected within the second space 14, the display control section 17 moves the display position of the pointer 13 only on the basis of the position of the fingertip having entered the second space 14 at first; however, other configurations may also be employed. For example, a configuration may be adopted in which, in a case where a plurality of positions of the fingertips detected by the position detection section 18 exist within the second space 14, the three-dimensional image displayed by the display unit 2 is changed on the basis of the plurality of positions of the fingertips. As the change in the three-dimensional image on the basis of the plurality of positions of the fingertips, for example, there may be employed reduction by pinch-in, enlargement by pinch-out, and movement and discarding of the three-dimensional object 12 by two-finger swipe. This makes it possible to move the display position of the pointer 13 on the basis of the position of a fingertip having entered the second space 14 at first, and to perform an operation other than the movement of the display position of the pointer 13 on the basis of the position of a fingertip having entered the second space 14 later. Therefore, it is possible to perform various operations on the three-dimensional image with an intuitive operation in the same manner as the operation of the movement of the display position of the pointer 13.

In addition, in a case where the configuration is adopted in which the three-dimensional image is changed on the basis of the positions of the plurality of fingertips, a configuration may further be adopted in which the display control section 17 sets a content of the change in the three-dimensional image on the basis of movement speed or movement acceleration of the plurality of fingertips. For example, a configuration may be adopted in which the three-dimensional object 12 is moved in a case where the movement speed or the movement acceleration of the fingertips at the time of execution of the two-finger swipe is equal to or less than a predetermined threshold value, whereas the three-dimensional object 12 pointed by the pointer 13 is discarded or a currently displayed three-dimensional image is switched to a next three-dimensional image in a case where the movement speed or the movement acceleration of the fingertips is larger than the threshold value. This makes it possible to perform more operations on the three-dimensional image by an intuitive operation in the same manner as the operation of the movement of the display position of the pointer 13.

(2) In addition, for example, as illustrated in FIG. 7, the processor 16 may be configured to implement a reporting section 19 in addition to the display control section 17 and the position detection section 18, and the reporting section 19 may be configured to determine whether the position of the detection target detected by the position detection section 18 has entered the second space 14 and to perform a predetermined reporting operation when determination is made that the position has entered the second space 14. As the predetermined reporting operation, for example, there may be employed at least one of an operation of displaying a predetermined icon (e.g., a finger icon) on the three-dimensional image, an operation of turning on an unillustrated notification light, an operation of blinking the three-dimensional image, an operation of temporarily changing the color of the three-dimensional image, or an operation of causing an unillustrated speaker to output a notification sound. This enables the user to understand that the user's intention to operate the three-dimensional image has been communicated to the image display apparatus 1.

(3) In addition, although the example has been given in which the pointer 13 is not moved to remain at the current position, for example, in a case where determination is made that the position of the fingertip detected by the position detection section 18 does not exist within the second space 14, other configurations may also be employed. For example, a configuration may be adopted to erase the pointer 13.

(4) In addition, although, in the first embodiment, the example has been given in which the controller 4 is disposed inside the base 5, and the controller 4 is integrated with the display unit 2, other configurations may also be employed. For example, the controller 4 may be disposed outside the base 5, and the controller 4 may be separated from the display unit 2. In a case where the controller 4 is separated from the display unit 2, the controller 4 may be sized to be larger.

(5) In addition, although, in the first embodiment, the example has been given in which the cylindrical screen 6 is irradiated with the image light 10 to display the three-dimensional image, other configurations may also be employed. For example, a configuration may be adopted to display the three-dimensional image using an apparatus in which a liquid crystal display is disposed on each surface of a cube.

(6) In addition, although, in the first embodiment, the example has been given in which the display unit 2 that enables the three-dimensional image to be visually recognized from 360° around the display unit 2 is used, other configurations may also be employed. For example, a configuration may be adopted to use the display unit 2 in which an angular range enabling the three-dimensional image to be visually recognized is narrower than 360°.

2. Second Embodiment: Image Display Apparatus 2-1 Configuration of Main Part

Next, description is given of an image display apparatus according to a second embodiment of the present disclosure. An overall configuration of the image display apparatus of the second embodiment is similar to that illustrated in FIG. 1, and thus illustration thereof is omitted. The image display apparatus 1 of the second embodiment is sized to be larger than the height of a person to be suitable in a case such as displaying the three-dimensional object 12 of a giant ancient creature in a museum, as illustrated in FIG. 8.

The image display apparatus 1 of the second embodiment differs from the first embodiment in that the second space 14 is set as a cylindrical space provided at a position spaced apart from the first space 11. Specifically, in the second embodiment, as illustrated in FIG. 8, the cylindrical second space 14 smaller than the first space 11 is set on upper side of a thin cylindrical detection device 20 provided separately from the display unit 2.

The shape of the second space 14 of the second embodiment is similar to the shape of the first space 11. That is, the ratio of radius $R_1$:height $H_1$ of the first space 11 is equal to the ratio of radius $R_2$:height $H_2$ of the second space 14. In the second space 14, there is set the cylindrical coordinate system $r_2 \theta_2 z_2$ with the center axis of the second space 14 being the $z_2$ axis and an intersection of a bottom surface of the second space 14 and the $z_2$ axis being the origin.

In addition, in the second embodiment, as illustrated in FIG. 9, the TOF sensor 3 is disposed at the center of an upper surface portion of the detection device 20 to shoot a range image on upper side of the detection device 20. A detection result of the TOF sensor 3 is transmitted to the controller 4 via a wireless communication section 21 provided in the detection device 20. In FIG. 9, a partially broken illustration is given to enable a configuration inside the detection device 20 to be visually recognized.

In addition, in the second embodiment, a method for calculating the coordinates ($r_2'$, $\theta_2'$, $z_2'$) of the move destination of the pointer 13 in step S104 of the control processing illustrated in FIG. 5 differs from that of the first embodiment. Specifically, as calculation expressions of $r_2'$, $\theta_2'$, $z_2'$, there are employed $r_1' = r_2' \times R_1/R_2$, $z_1' = z_2' \times R_1/R_2$, and $\theta_1' = \theta_2'$. Thus, the user changes the position of the fingertip in the second space 14 to thereby be able to freely alter the position of the pointer 13 in the first space 11.

As described above, in the image display apparatus 1 according to the second embodiment of the present disclosure, the second space 14 is set as a space provided at a position spaced apart from the first space 11, thus making it possible to operate the position of the pointer 13 more intuitively even when the detection target is not able to be inserted into the first space 11.

In addition, in the image display apparatus 1 according to the second embodiment of the present disclosure, the shape of the second space 14 is similar to the shape of the first space 11. Therefore, even in a case where the display unit 2 is sized to be large enough to be equal to or more than the height of a person or in a case where the display unit 2 is installed at a position away from an operator, for example, it is possible to alter the position of the pointer 13 with an intuitive operation.

In addition, in the image display apparatus 1 according to the first embodiment of the present disclosure, the display unit 2 includes the cylindrical screen 6 on which the three-dimensional image is displayed, and the first space 11 is set as a space of a hollow portion inside the screen 6, thus making it possible to display the three-dimensional object 12 in the screen 6.

In addition, in the image display apparatus 1 according to the second embodiment of the present disclosure, the cylindrical coordinate system $r_2\theta_2z_2$ with the center axis of the second space 14 being the $z_2$ axis is set in the second space 14 to detect the coordinates $(r_2', \theta_2', z_2')$ at the position of the detection target using the cylindrical coordinate system $r_2\theta_2z_2$. Therefore, the coordinate system is suitable for the shape of the second space 14, thus making it possible to represent the position of the detection target more appropriately.

It is to be noted that the present technology may have the following configurations.

(1)

An image display apparatus including:

a display unit that displays a three-dimensional image, by which a three-dimensional object and a pointer appear to exist within a first space partitioned by a member configuring an outwardly convex outer surface, to be visually recognizable from a plurality of circumferential directions;

a position detection section that detects a position of a detection target; and a display control section that moves a display position of the pointer displayed by the display unit on a basis of a position of the detection target that exists within a predetermined second space not overlapping the first space among the position of the detection target detected by the position detection section.

(2)

The image display apparatus according to (1), in which the second space includes a space surrounding a circumference of the first space.

(3)

The image display apparatus according to (2), in which the display unit includes a cylindrical screen on which the three-dimensional image is displayed, the first space includes a space of a hollow portion inside the screen, and the second space includes a cylindrical space surrounding the circumference of the first space.

(4)

The image display apparatus according to (3), in which a cylindrical coordinate system $r_2\theta_2z_2$ with a center axis of the second space being a $z_2$ axis is set in the second space, and the position detection section detects coordinates $(r_2', \theta_2', z_2')$ of the position of the detection target using the cylindrical coordinate system $r_2\theta_2z_2$.

(5)

The image display apparatus according to (4), in which a cylindrical coordinate system $r_1\theta_1z_1$ with a center axis of the first space being a $z_1$ axis is set in the first space, and the display control section moves the display position of the pointer displayed by the display unit to allow values of $\theta_2'$ and $z_2'$ of the coordinates $(r_2', \theta_2', z_2')$ detected by the position detection section and values of $\theta_1'$ and $z_1'$ of coordinates $(r_1', \theta_1', z_1')$ of the pointer in the cylindrical coordinate system $r_1\theta_1z_1$ to be the same.

(6)

The image display apparatus according to (5), in which the display control section moves the display position of the pointer displayed by the display unit to allow $r_1'$ of the coordinates $(r_1', \theta_1', z_1')$ of the pointer in the cylindrical coordinate system $r_1\theta_1z_1$ to be "0" in a case where $r_2'$ of the coordinates $(r_2', \theta_2', z_2')$ detected by the position detection section is same as a value of a radius of the first space, and to allow $r_1'$ of the coordinates $(r_1', \theta_1', z_1')$ to be same as the value of the radius of the first space in a case where $r_2'$ of the coordinates $(r_2', \theta_2', z_2')$ is same as a value of a radius of the second space.

(7)

The image display apparatus according to any one of (1) to (6), including an information acquisition unit that is disposed at an upper portion or a lower portion of the display unit and acquires information concerning the position of the detection target, in which the position detection section detects the position of the detection target on a basis of a result of detection of the information acquisition unit.

(8)

The image display apparatus according to (7), in which the information acquisition unit includes a TOF sensor, a camera, a touch panel, a capacitance sensor, or a magnetic sensor.

(9)

The image display apparatus according to any one of (1) to (8), including a reporting section that performs a predetermined reporting operation when the position of the detection target detected by the position detection section has entered the second space.

(10)

The image display apparatus according to (9), in which the reporting section performs, as the reporting operation, at least one of lighting of a light, blinking of the three-dimensional image, color change in the three-dimensional image, or output of a notification sound.

(11)

The image display apparatus according to any one of (1) to (10), in which the detection target includes a fingertip of a person, and the display control section moves, in a case where a plurality of positions of fingertips detected by the position detection section exist within the second space, the display position of the pointer displayed by the display unit only on a basis of a position of a fingertip having entered the second space at first among the plurality of the positions of the fingertips.

(12)

The image display apparatus according to any one of (1) to (10), in which the detection target includes a fingertip of a person, and the display control section changes, in a case where a plurality of positions of fingertips detected by the position detection section exist within the second space, the three-dimensional image displayed by the display unit on a basis of movements of the plurality of fingertips.

(13)
The image display apparatus according to (12), in which the display control section sets a content of the change in the three-dimensional image on a basis of movement speed or movement acceleration of the plurality of fingertips.
(14)
The image display apparatus according to (1), in which the second space includes a space provided at a position spaced apart from the first space.
(15)
The image display apparatus according to (14), in which a shape of the second space is similar to a shape of the first space.
(16)
The image display apparatus according to (1), in which the display unit includes a cylindrical screen on which the three-dimensional image is displayed,
the first space includes a space of a hollow portion inside the screen, and
the second space includes a cylindrical space spaced apart from the first space.
(17)
The image display apparatus according to (16), in which a cylindrical coordinate system $r_2\theta_2z_2$ with a center axis of the second space being a $z_2$ axis is set in the second space, and
the position detection section detects coordinates $(r_2', \theta_2', z_2')$ of the position of the detection target using the cylindrical coordinate system $r_2\theta_2z_2$.

REFERENCE NUMERALS LIST 1 image display apparatus
2 display unit
3 information acquisition unit
4 controller
5 base
6 screen
7 reflective mirror
8 optical axis
9 emission unit
10 image light
11 first space
12 three-dimensional object
13 pointer
14 second space
15 storage device
16 processor
17 display control section
18 position detection section
19 reporting section
20 detection device
21 wireless communication section

The invention claimed is:
1. An image display apparatus, comprising:
a cylindrical screen;
a projector configured to display a three-dimensional image on the cylindrical screen, by which a three-dimensional object and a pointer appear to exist within a first space partitioned by the cylindrical screen, wherein
the first space comprises a space of a hollow portion inside the cylindrical screen, and
the three-dimensional image is visually recognizable from a plurality of circumferential directions; and
a processor configured to:
detect, based on a cylindrical coordinate system $r_2\theta_2z_2$ set in a second space, coordinates $(r_2', \theta_2', z_2')$ of a position of a detection target that exists within the second space, wherein
the second space comprises a cylindrical space surrounding a circumference of the first space,
a center axis of the second space corresponds to a $z_2$ axis of cylindrical coordinate system $r_2\theta_2z_2$, and
the second space does not overlap with the first space; and
move a display position of the pointer based on the detected coordinates $(r_2', \theta_2', z_2')$ of the position of the detection target that exists within the second space.

2. The image display apparatus according to claim 1, wherein
a cylindrical coordinate system $r_1\theta_1z_1$ with a center axis of the first space being a $z_1$ axis is set in the first space, and
the processor is further configured to move the display position of the pointer to allow values of $\theta_2'$ and $z_2'$ of the coordinates $(r_2', \theta_2', z_2')$ and values of $\theta_1'$ and $z_1'$ of coordinates $(r_1', \theta_1', z_1')$ of the pointer in the cylindrical coordinate system $r_1\theta_1z_1$ to be the same.

3. The image display apparatus according to claim 2, wherein the processor is further configured to move the display position of the pointer to
allow $r_1'$ of the coordinates $(r_1', \theta_1', z_1')$ of the pointer in the cylindrical coordinate system $r_1\theta_1z_1$ to be "0" in a case where $r_2'$ of the coordinates $(r_2', \theta_2', z_2')$ is same as a value of a radius of the first space, and
allow $r_1'$ of the coordinates $(r_1', \theta_1', z_1')$ to be same as the value of the radius of the first space in a case where $r_2'$ of the coordinates $(r_2', \theta_2', z_2')$ is same as a value of a radius of the second space.

4. The image display apparatus according to claim 1, further comprising at least one of a sensor, a camera, or a touch panel, wherein
the at least one of the sensor, the camera, or the touch panel is configured to acquire information concerning the position of the detection target, and
the processor is configured to detect the position of the detection target based on the acquired information.

5. The image display apparatus according to claim 4, wherein the sensor comprises at least one of a TOF sensor, a capacitance sensor, or a magnetic sensor.

6. The image display apparatus according to claim 1, wherein the processor is further configured to perform a reporting operation based on the position of the detection target that has entered the second space.

7. The image display apparatus according to claim 6, wherein the processor is further configured to perform, as the reporting operation, at least one of an operation of displaying a specific icon on the three-dimensional image, an operation of turning on a notification light, an operation of blinking the three-dimensional image, an operation of temporarily changing a color of the three-dimensional image, or an operation of causing a speaker to output a notification sound.

8. The image display apparatus according to claim 1, wherein
the detection target comprises a fingertip of a person, and
the processor is further configured to move, in a case where a plurality of positions of fingertips exists within the second space, the display position of the pointer based only on a position of the fingertip having entered the second space at first among the plurality of positions of the fingertips.

9. The image display apparatus according to claim 1, wherein
the detection target comprises a fingertip of a person, and
the processor is further configured to change, in a case where a plurality of positions of fingertips exists within the second space, the three-dimensional image based on movements of the fingertips.

10. The image display apparatus according to claim 9, wherein the processor is further configured to set a content of the change in the three-dimensional image based on movement speed or movement acceleration of the fingertips.

11. An image display apparatus, comprising:
a cylindrical screen;
a projector configured to display a three-dimensional image on the cylindrical screen, by which a three-dimensional object and a pointer appear to exist within a first space partitioned by the cylindrical screen, wherein
the first space comprises a space of a hollow portion inside the cylindrical screen, and
the three-dimensional image is visually recognizable from a plurality of circumferential directions; and
a processor configured to:
detect, based on a cylindrical coordinate system $r_2\theta_2z_2$ set in a second space, coordinates ($r_2'$, $\theta_2'$, $z_2'$) of a position of a detection target that exists within the second space, wherein
the second space comprises a cylindrical space spaced apart from the first space,
a center axis of the second space corresponds to a $z_2$ axis of cylindrical coordinate system $r_2\theta_2z_2$, and
the second space does not overlap with the first space; and
move a display position of the pointer based on the detected coordinates ($r_2'$, $\theta_2'$, $z_2'$) of the position of the detection target that exists within the second space.

* * * * *